Sept. 26, 1939.    I. M. TERWILLIGER    2,173,866
ART IN CINEMATOGRAPHY OF PRODUCING FRACTIONAL DENSITY
COMBINATIONS BETWEEN DIFFERING ASPECTS OF A SCENE
Original Filed Aug. 6, 1935    2 Sheets-Sheet 1
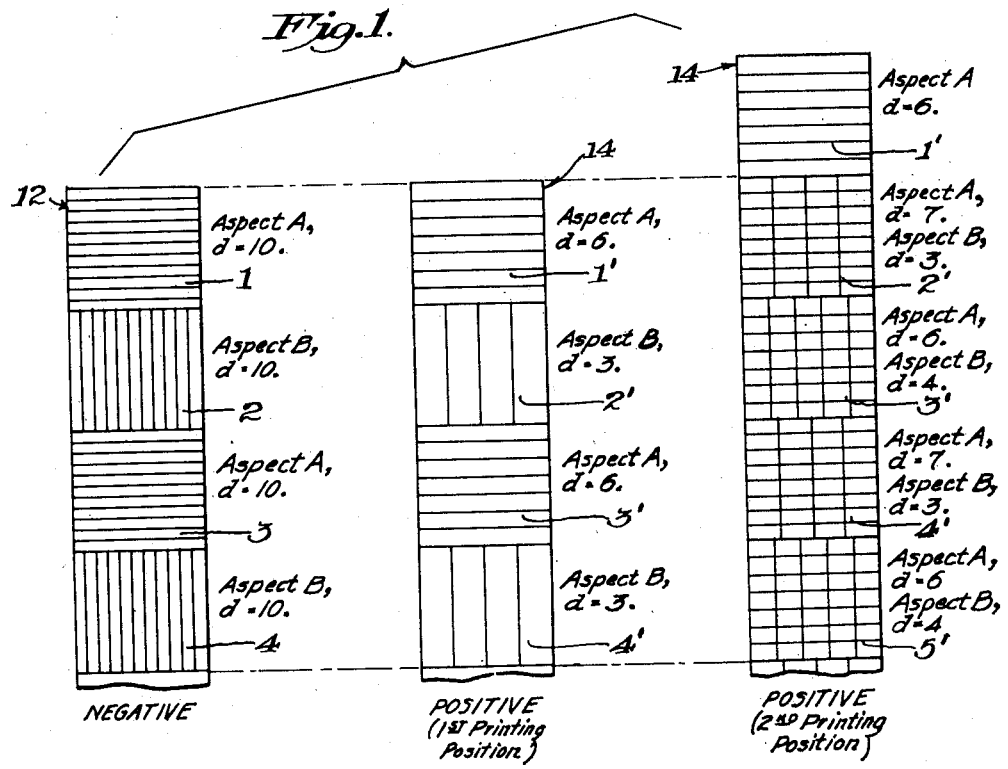
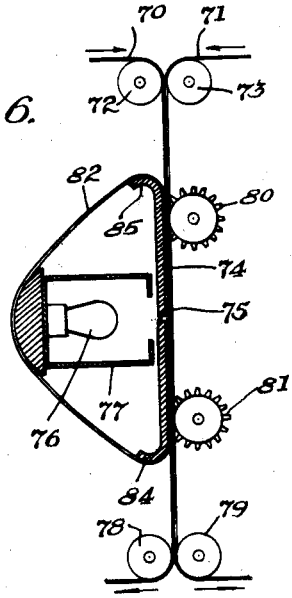
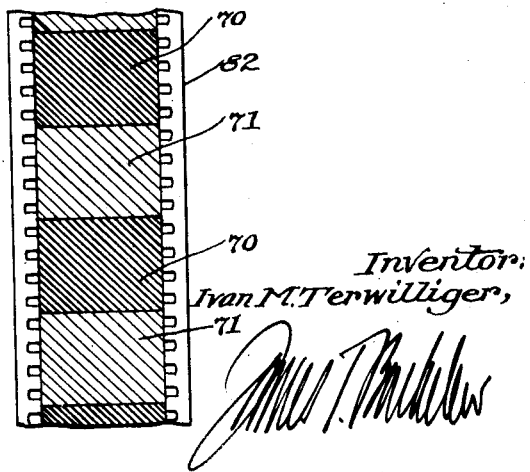
Inventor:
Ivan M. Terwilliger,
Attorney

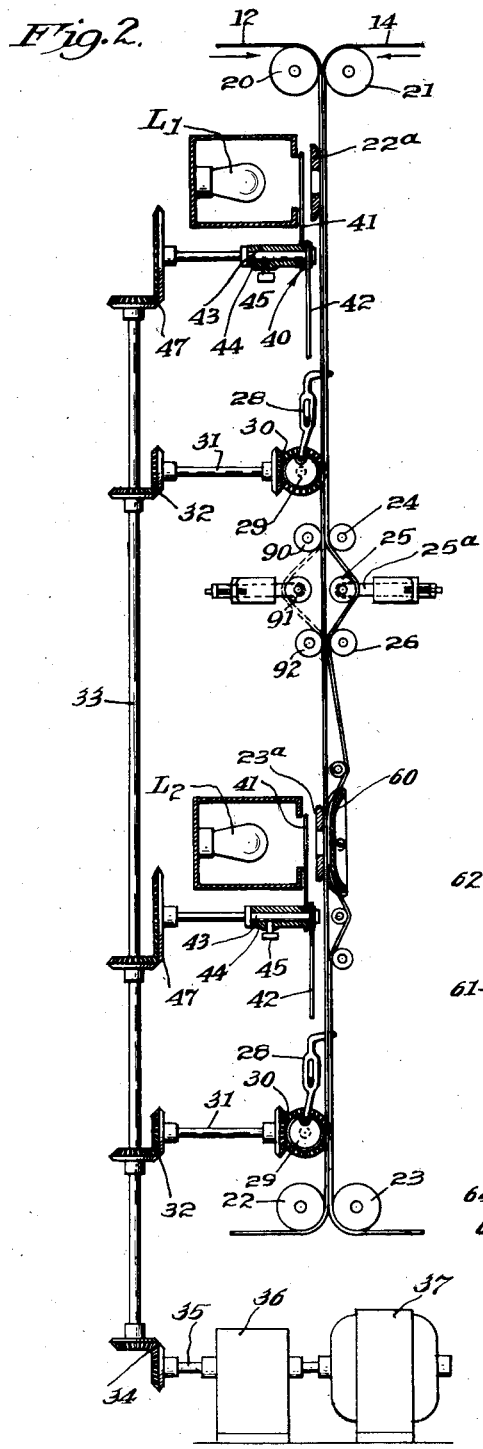
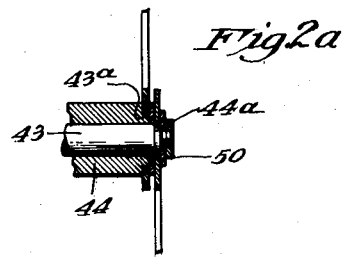
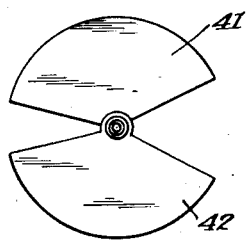
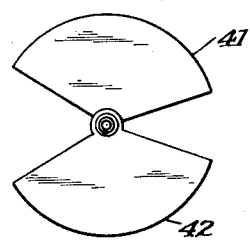
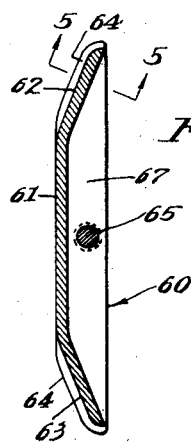

Patented Sept. 26, 1939

2,173,866

UNITED STATES PATENT OFFICE 2,173,866

ART IN CINEMATOGRAPHY OF PRODUCING FRACTIONAL DENSITY COMBINATIONS BETWEEN DIFFERING ASPECTS OF A SCENE

Ivan M. Terwilliger, Altadena, Calif.

Application August 6, 1935, Serial No. 34,924
Renewed June 24, 1938

17 Claims. (Cl. 95—75)

This invention relates generally to the art of stereoscopic motion pictures.

In my prior application, Ser. No. 612,897, filed May 23, 1932, now Patent 2,104,779 and entitled Method of cinematography to produce stereoscopic solid effects, I suggested the fact that cinematographic stereoscopic vision is not necessarily binocular, but is rather the production of a properly timed and coordinated succession of mental image impressions corresponding to a set of stereoscopic aspects of a scene. In other words, if a succession of pairs of stereoscopic aspect images be intermingled in proper combination on a film strip and projected, the observer may receive a satisfactory stereoscopic impression.

It is the primary object of the present invention to provide methods of combining such sets of stereoscopic aspect images in such manner as to secure a more harmonious as well as sharp and distinct stereoscopic projection than has heretofore been possible.

In my application referred to above it was described that a stereoscopic pair of images may be obtained not only by the usual means of two cameras placed with their objectives disposed eye-distance apart, but may be obtained as well by photographing certain of the images while the camera is in one position relative to the object, and photographing other images in the same camera with the camera shifted to a different position along the same optical axis as that along which the first mentioned images were produced. Such a method produces differing aspect images, in some of which the camera "sees" further around the objects of the scene than in other of the images, and if the camera is shifted a proper distance in taking the successive images, any pair of successive images will, taken together, have all the characteristics of a usual pair of stereoscopic images photographed at the usual stereoscopic angle. The application here mentioned described a means for shifting the film relative to the camera objective in order that the images would be the same size in the two positions of the camera. This application also suggested that desired effects were obtained by employing more images taken in one of the camera positions than images taken in the other. In other words, one of the images might predominate over the other in final projection.

It is a more specific object of the present invention to provide improved methods of combining stereoscopic images for projection, and improved combinations of predominating and predominated images.

In accordance with the present invention, pairs or sets of stereoscopic images, originally prepared by any photographic method, are combined on the projection positive in variant densities in such manner that one stereoscopic aspect of the scene predominates over the others. That is, one aspect of the scene (one member of the stereoscopic set) is printed in greater density than the other. The effect, then, is that the first, or what I term the "dominant" aspect image, causes the projected image to be sharp, while the second, or what I may term the "recessive" aspect image, which corresponds to a slightly differing aspect of the scene, causes the projected picture to register on the brain as stereoscopic. This recessive aspect image is preferably designed to register on the eye just below the point of conscious recognition. As projected, the eye is incapable of analyzing the proportions of the mixture of the two images, but receives an impression resulting in a stereoscopic registration on the brain. The variant aspects of the scene may be combined in differential intensities on each single frame, and the two aspects may predominate alternately, or one aspect may always predominate, though both may fluctuate in intensity, or the secondary aspect may appear in part recurrently on a limited number of frames at predetermined timed intervals. The result of such combinations of variant density stereoscopic images is increased harmony between the two aspects of the image in projection, including increased sharpness of definition of the projected picture, as well as increased smoothness of projection, and improvement in the stereoscopic effect.

As stated previously, I may utilize for the purpose of the present invention stereoscopic sets of images formed by any photographic method, including the usual method using two camera objectives spaced eye-distance apart, or by the method of shifting the camera longitudinally on its optical axis between taking of successive images, as disclosed in my aforesaid application, Ser. No. 612,897, or by employment of a refractor such for instance as disclosed in my copending application, Ser. No. 646,749, filed Dec. 12, 1932, entitled Method and means for producing stereoscopic photographic effects, or otherwise. In my application, Ser. No. 646,749, I disclose a means for forming a set of three stereoscopic images instead of the usual two, each taken in a slightly different aspect from the other two. Said application also discloses the formation on a single film frame of two or more superposed images, which may be in different densities, and in such aspect the present application may be considered as a continuation in part of Ser. No. 646,749.

Further objects of the invention, as well as the details of the invention itself, will be understood from the following detailed description of typical selected illustrations thereof, reference for this purpose being had to the accompanying drawings, in which:

Fig. 1 is a diagrammatic view showing negative and positive film strips in their relative printing positions in accordance with one form of the invention;

Fig. 2 is a somewhat diagrammatic view showing one form of printer capable of performing methods in accordance with the present invention;

Fig. 2a is a detail section of a portion of the printer of Fig. 2;

Fig. 3 is an elevational view of the upper shutter of the printer of Fig. 2;

Fig. 3a is a similar view of the lower shutter of the same printer;

Fig. 4 is an enlarged view of a film offset device of the printer of Fig. 2;

Fig. 5 is a detail section taken on line 5—5 of Fig. 4;

Fig. 6 is a diagrammatic view of an alternative form of printer; and

Fig. 7 shows a portion of a masking band employed in the printer of Fig. 6.

The methods and steps of the present invention are susceptible to comparatively wide variation. In all instances, however, there is effected a combination of differential intensity images of variant aspects of a scene. By variant aspects of a scene, I refer to two or more aspects of a scene, related to each other as a stereoscopic pair, as two images taken through camera objectives spaced eye-distance apart, or in any other manner. By differential intensity images, I refer to the printing of one aspect image of a stereoscopic pair at higher density than the other, or in other words, one image is in dominant intensity and the other is in recessive intensity. These dominant and recessive intensity images of the two aspects of the scene may or may not be printed in superposition, but preferably are so printed. In projection, the image in dominant intensity serves principally to define the projected picture and make it sharp, while the image in recessive intensity, registering on the eye preferably at a point below conscious recognition, serves to give the stereoscopic effect.

With this generalization and definition of terms in mind, the invention will best be understood by considering several typical examples of the invention.

In Fig. 1, numeral 12 designates a diagrammatically illustrated negative film strip, having successive frames 1, 2, 3, 4, etc. Alternate frames are to be considered as bearing images, corresponding to any two stereoscopically related aspects of the scene, A and B. For instance, let it be assumed that the odd numbered frames bear images taken in aspect A, and that the even numbered frames bear images taken in aspect B. Aspect A images are designated in Fig. 1 by horizontal lines, and aspect B images are designated by vertical lines. These lines are also, according to the convention here adopted, representative of the density of the image, ten lines on a frame area being taken as normal average picture density. Thus each of frames 1, 2, 3 etc. is pictured in Fig. 1 by ten vertical or horizontal lines, and the density of such frames is represented by the numeral 10. Each of such frames has therefore received a full or normal exposure to the object, frames 1, 3, 5, etc., in aspect A, and frames 2, 4, 6, etc., in aspect B.

Numeral 14 in Fig. 1 indicates the printed positive film strip, being shown in Fig. 1 in two positions, first, with its frames 1', 2', 3', etc., located opposite respective negative frames 1, 2, 3, etc., from which they were printed in a first printing operation, and second, displaced rearwardly by one frame as compared with its first printing position relative to the negative, positive frame 2', for example, then being opposite and printed from negative frame 1, etc.

Thus the positive is twice printed from the negative, and in the second printing operation the positive lags one frame length as compared with its original printing position relative to the negative. It has been stated that all aspect A images and all aspect B images on negative 12 have been formed by full exposures to the object, or field of view, so that upon development said images will all be of normal image density, represented according to the present convention by the numeral 10. In the first printing of positive 14 from negative 12, with positive frames 1', 2', 3', etc., printed respectively from negative frames 1, 2, 3, etc., the positive is printed only to partial density, alternate positive frames usually being printed to different densities. For the purpose of the present example, let stereoscopic aspect A be selected as the dominant aspect and stereoscopic aspect B be the recessive aspect. The frames bearing images formed in aspect A, here the odd numbered frames, are then printed onto the positive to higher density than are the frames bearing images in aspect B, here the even numbered frames. As a typical example, it may be assumed that aspect A and aspect B images are printed on the positive in this first printing operation to densities represented by numerals 6 and 3, respectively, on the arbitrarily chosen basis of 10. The horizontal and vertical density lines on the positive in the first printing position of Fig. 1 represent such densities.

In the second printing operation, the positive is shifted backwardly one frame length relative to the negative, so that an image in aspect A becomes superposed over an image in aspect B and vice versa. Moreover, in the second printing operation alternate frames are again printed in differing densities, which are so calculated as to give full density, or a density of 10, to each final positive image. Thus, positive frame 2', already bearing an image in aspect B of density 3, is printed from negative frame 1 to a density of 7. Frame 2' therefore has a B aspect image of density 3 and an A aspect image of density 7, or a composite image of a density of substantially 10. Likewise, positive frame 3', bearing an A aspect image of density 6, has superposed thereover an image in aspect B of density 4, and therefore also bears a composite image of a density of substantially 10.

Thus successive frames of the final positive bear superposed images of successive stereoscopic pairs, the stereoscopic composites so formed being printed all at substantially the same densities. The images in each stereoscopic aspect, however, fluctuate in density from frame to frame, the images in dominant aspect A alternating between densities of 6 and 7, while the superposed images in recessive aspect B at the same time alternate between densities of 4 and 3.

Thus even numbered frames have an A aspect image of density 6 and a B aspect image of density 4, or a total density of 10, while odd numbered frames have an A aspect image of density 7 and a B aspect image of density 3, or a total density likewise of 10.

It will be seen that the A aspect images will predominate in intensity in final projection, and, in the present instance, will predominate in projection from both the odd numbered and the even numbered frames.

It was previously stated that one aspect of the image was to predominate in final projection, and was to define the image and make it sharp on the projection screen, while the other image, projected in weaker or recessive intensity, was to register on the eye at a point preferably just below the point of conscious recognition, and was to contribute the stereoscopic impression. A positive printed with superposed varient-density stereoscopic aspect images as just described meets this condition in an advantageous manner. In the illustration given odd numbered frames were printed with A aspect images of density 6 and B aspect images of density 4, while even numbered frames were printed with A aspect images of density 7 and B aspect images of density 3, aspect A thus predominating over aspect B in a ratio of 13 to 7. This balance is subject to rather wide variation within the broad scope of the present invention. For example, odd frames may be printed with A and B images of densities of 5 each, and even frames may be printed with A images of density of 6 and with B images of density of 4, giving an A image predomination of only 11 to 9. Or the ratio may be increased, odd frames having A and B images of densities 7 and 3, respectively, and even frames having A and B images of densities of 8 and 2, respectively giving an overall A predominance of 15 to 5. It will be perceived that in each of the illustrations given, both the A and B images vary by one point of density from frame to frame. It will be obvious that it is also within the scope of the invention to utilize combinations in which the A and B images vary by two or even more points of density from frame to frame. Thus, I may utilize a combination in which odd frames have A and B images of densities 8 and 2, and even frames have A and B image of densities 10 and 0, giving an A predominance ratio of 18 to 2, or as another example, a combination in which odd frames have A and B images of densities 5 and 5, and even frames have densities of 9 and 1, giving an A predominance ratio of 14 to 6.

All such combinations give harmonious stereoscopic projection, and vary only in the degree of the stereoscopic effect produced. For example, if the A image is made to predominate over the B image in a ratio of 19 to 1, the stereoscopic effect is less definite than if the A image predominates only in a ratio of say 12 to 8. On the other hand, projection may be smoother in the first case, since the B image will be far below the point of conscious recognition, whereas in the second case, the B aspect image may be near the point of separate analysis by the eye and conscious recognition. The exact balance to be used in a given case may thus be varied within rather wide limits, depending upon results desired. In any case, however, a combination of stereoscopic images in accordance with the general method here outlined results in obtainment of a smooth harmonicus combination of dominant and recessive stereoscopic images on the projection screen, giving the illusion of true third dimensional vision.

In the illustrations described above, one aspect image predominates over the other for a given length of film. In some cases I may print the positive from the negative in the same manner as previously described, but may place alternate emphasis on the two aspects, with neither aspect predominating on every frame. For example, odd numbered frames of the positive may have superposed A and B aspect images of densities of 7 and 3, respectively, with even numbered frames bearing superposed A and B images of densities of 3 and 7, respectively. Such a combination, in which the two aspects predominate alternately on successive frames, may be utilized where there is but relatively small dissimiliarity between the individual members of the stereoscopic pairs of images.

I may also so combine the images that emphasis alternates between the two aspects, yet one aspect predominates in additive total. For example, odd numbered frames may bear A and B aspect images of densities of 9 and 1, respectively, while even numbered frames bear A and B aspect images of 3 and 7, respectively. In this case, the A aspect images predominate on the odd frames, the B aspect images predominate on the even frames, and the A aspect images predominate in additive total of all frames.

I may also so combine the images that one aspect predominates over the other, though each aspect always appears at the same density, rather than fluctuating in density from frame to frame.

The image combinations described above may be effected by a printer such as diagrammatically indicated in Fig. 2. This printer is of the contact type, and is a step printer, though the printer could obviously be a projection printer, and a suitable printer of the continuous type will be described hereinafter. The negative and positive films 12 and 14 pass from the supply reels, not shown, over adjacent rollers 20 and 21 at the top of the printer, and thence pass downwardly through the printer, finally passing around rollers 22 and 23 at the bottom to go to the take-up reels, not shown. The two films are brought into close contact with each other over an aperture plate 22a opposite a first printing light $L_1$, and again over an aperture plate 23a opposite a second printing light $L_2$. Between lights $L_1$ and $L_2$ the positive is threaded between rollers 24, 25, and 26, which take up a given length of the film, one, two, or more frames, depending upon their adjustment. For instance, these rollers may be adjusted to take up just one frame length in the positive, and the result is then that the positive is displace backwardly by one frame length relative to the negative, so that a given image on the negative printed on a given frame of the positive by light $L_1$, will be printed by light $L_2$ on the positive frame next ahead. Thus each positive frame is printed from two successive frames of the negative. As here shown, the center roller 25 is for the present purpose mounted on an adjustable arm 25a.

Although any suitable intermittent film movement mechanism may be utilized on the printer, I here indicate a pair of conventional claw mechanisms 28, one below each of the printing lights. These claw mechanisms, which are adapted to engage the perforations of the superposed negative and positive film strips to advance them intermittently a distance of one frame length, or more, are here diagrammatically shown as operated by cranks 29 on shafts driven through gears indicated at 30 from shafts 31, the latter being driven through bevel gears at 32 from a vertical drive shaft 33. Shaft 33 is here indicated as driven through gears at 34 from a shaft 35, which in turn is driven through reduction gear set 36 from motor 37. It will be evident that such a claw mechanism as is here indicated will engage and advance the film strips once for each rotation of its crank—and that the distance the film is advanced depends upon the throw of the crank. If it is desired to advance the film strips two frame lengths at a time, claw mechanism and crank are substituted having a double throw.

An adjustable two-blade shutter mechanism 40 is provided between each printing light and the corresponding aperture plate. Each such mechanism is provided with two shutter blades 41 and 42, mounted respectively on a shaft 43 and a concentric sleeve or hollow shaft 44. Means are provided for setting these blades and their shafts in rotatably adjusted positions relative to one another; for the sake of simplicity, I simply indicate for this purpose a thumb screw 45 mounted in hollow shaft 44 and adapted to be set tightly against inner shaft 43. The center shafts 43 of the two shutter mechanisms are geared at 47 to vertical drive shaft 33. The gear ratios of the printer usually are such that the shutters make one-half of a complete revolution for each frame length advance of the film strip.

It will readily be seen that the printer as thus described is adapted to perform in one continuous operation the two printing steps of the previously described method of combining stereoscopic images, illustrated generally by Fig. 1. The negative 12 and positive 14 of Fig. 1 are threaded in the printer. The blades of the two shutters are then adjusted to give the densities required. For instance, the shutter blades 41 and 42 are so positioned as to provide two angular openings therebetween, of areas in a ratio of 6 to 3, and the film is so arranged that the 6 unit shutter opening passes the printing aperture when odd numbered frames (A aspect images) are registered at the printing aperture, while the 3 unit shutter opening passes the printing aperture when even numbered frames (B aspect images) are so registered. Light from $L_1$ is passed in such amount that odd numbered frames are thereupon printed to a density of 6, while even numbered frames are printed to a density of 3. Similarly, the blades of the shutter mechanism associated with printing light $L_2$ are so adjusted that shutter openings of areas in a ratio of 7 to 4 are provided. Arrangements are so made that odd numbered negative frames (A aspect images), which were printed onto odd numbered positive frames at density 6 by light $L_1$, are at the printing aperture of light $L_2$ when the 7 unit shutter opening passes said aperture, while the even numbered negative frames (B aspect images) are at that printing aperture when the 4 unit shutter opening passes by. It being recalled that even numbered positive frames are registered with odd numbered negative frames, and vice versa, at the time of printing by light $L_2$, said light is adjusted to such intensity that the odd and even numbered positive frames are then printed with B and A aspect images to densities of 4 and 7, respectively. Thus both steps are accomplished in one continuous operation, and the complete twice-printed positive is produced at once. It will be evident that by proper adjustment of the shutter blades of the printer, any of the image combinations heretofore described, as well as numerous others, may readily be effected. In this connection the printer is preferably provided with demountable and interchangeable shutter blades, of various angular dimensions, which may be selected to give shutter openings of any sizes required for the densities to be produced on the positive. The shutter blades 41 and 42 (see Figs. 2a and 3) are demountably but non-rotatably mounted on squared end portions 43a and 44a of concentric shafts 43 and 44, respectively, the assembly being retained in position by suitable washers and a nut 50 screwed on the extremity of shaft 43. Shutter blades of proper angles being on the shutter shafts, the proper shutter openings are fixed by relative rotative adjustment of shafts 43 and 44, which are finally locked together as by means of screw 45.

The printer is capable of varying not only the relative densities of the superposed images, but of forming alternative combinations by adjustment of rollers 24, 25 and 26 to take up more than one frame length of the positive between the two printing stations. It will be evident that if desired the two printings of the positive may be effected in two separate runs through the printer. In such instances, a printer of the type of Figs. 2 and 3, but having but one printing station, may be utilized; or, the printer of Figs. 2 and 3 may be utilized, one of the printing lights simply being left dark.

When the stereoscopically related pairs of images are originally produced by certain methods, for example, by photographing through two separate objectives mounted eye distance apart, the images of a given pair occupy slightly different positions on their two frame areas. That is, one image may be displaced horizontally on its frame relative to the placement of the other image on its frame. This condition of course means that if the edges of the negative and positive film strips are accurately registered with one another in printing, the two stereoscopically related images when superposed in accordance with the present invention will not register with each other with the necessary accuracy. The printer of Fig. 2 is designed to correct this condition by the provision of an adjustable edge guide for one of the films only, designed to displace one film strip slightly with reference to the other, and so print the different aspect images in accurate register on the positive. Such an edge guide is designated in Fig. 2 at 60, and is there typically indicated as located opposite the second printing aperture, though the printer may be equipped with a similar edge guide opposite the first printing aperture, if desired. This device, which is optionally provided, has a flat guide surface 61 holding the positive film up to the negative and against the printing aperture plate, and has inclined guide portions 62 and 63 merging with surface 60 and provided with edge guide flanges 64. The device is movable bodily in a direction transversely of the film by means of a micrometer lead screw 65, journaled in any suitable mounting, not shown, and engaging guide-member flanges 67. Flanges 62 and 63 guide the edges of the positive film and establish its position relative to the negative, and by means of screw 65, which preferably has a fine thread, a precision adjustment of the positive with reference to the negative may be made. It may be stated that when utilizing this adjustment for the purpose of superposing two stereoscopically related images, corresponding points in the background rather than in the foreground preferably are brought into exact registration with one another, allowing foreground image points to have any slight misregistration which may be present. Since one of the superposed images will be below the point of conscious recognition in density, such misregistration of foreground images will have simply the effect of causing the projected picture to appear stereoscopic.

In carrying out this modification of the general process, the negative and positive films are run through the printer, and, assuming the different aspect images to alternate on the negative strip, every other frame of the negative is printed onto the positive at the upper printing station, the shutter being, for instance, provided with but one light passing opening, so that the remaining frames are blanked. At the second printing station, the positive film strip is laterally displaced by the necessary distance, and the shutter is again arranged to print only every other frame—that is, those not printed at the first printing station. Thus, images in one aspect are printed at the first aperture, and images in the other aspect are printed at the second aperture. The amount of lateral offset of the positive film at the second aperture is such that a given point in an image in one aspect there printed onto a positive frame will later exactly register with the corresponding point in a counterpart image in the other aspect printed at the other aperture. In this first printing operation, the positive strip is not to be displaced longitudinally relatively to the negative before passing the second printing station, and I may therefore provide a set of adjustable negative film take-up rollers 90, 91 and 92, adjustable to take up just the length of the negative strip necessary to cause the negative and positive strips to pass the second printing station in the same position with reference to each other as they assumed at the first printing station. It will be evident that the two printing operations thus described corresvond to the printing operation performed at the first printing station in the previously described process, illustrated by Fig. 1. The films are then run through the double aperture printer a second time, but this time with the positive displaced one frame length relative to the negative, and again only every other frame is printed at each aperture, and the positive is laterally displaced at the second printing station by the same amount as before. The result is that, at the first printing station, the images in one aspect on the negative are superposed, with two given points in exact registration, and printed over images in the other aspect printed on the positive at the second printing station in the first run of the films through the printer, while at the second printing station images in the other aspect on the negative are superposed with two given points in exact registration, and printed over images in the first aspect printed on the positive at the first printing station on the prior run of the films through the printer. Densities of images may obviously be regulated in any of the various manners previously described. For example, images in one aspect on the negative might be printed onto the positive at a density of 8 in the first printing run, and at a density of 3 in the second printing run, and images in the other aspect would then be printed to a density of 7 in the first printing run, and to a density of 2 in the second printing run. The result would be a positive film bearing successive composite images, each composed of registered, variant-aspect components, and each having a total density number of 10, and with the density numbers of individual components fluctuating along the film strips.

It will be evident that the method described immediately above may also be practiced when the two variant aspects are photographed on separate negatives. In such case I may employ the printer of Fig. 2, adjusted to move the film strips one frame length at a time, and with each shutter device provided with two light passing openings. I first thread both negative films in the printer, and then adjust the offset film guide until two selected prints in the images coincide at the second aperture. With the offset guide so adjusted, the negatives are removed, one negative and the raw positive are seen through the printer and printed at the first aperture, producing on the positive images all in the one aspect, but to differential densities, depending upon the setting of the shutter. No printing is at this time effected at the second aperture. Then the other negative and the partially printed positive are seen through the printer and printed at the second aperture, the positive being laterally offet at that point by an amount determined by the previously made adjustment of the edge guide. No printing is at this time effected at the first aperture. By this operation, the images in the aspect contained on the second negative are superposed on the positive over images in the aspect contained on the first negative, with the two selected points in the pairs of superposed images exactly registering. The images thus printed on the positive in this second printing will be printed to densities complementary to densities given the positive images in the first printing operation, so that the final composite images will have a uniform over-all density.

Fig. 6 shows diagrammatically a continuous type printer adapted to the printing methods hereinbefore described. The negative and positive films 70 and 71 pass from the feed reels, not shown, around adjacent rollers 72 and 73, respectively, and thence pass, in contact with one another, over aperture plate 74 provided with transverse light slit 75, which is illuminated by light 76 within light house 77. From plate 74 the films go over adjacent rollers 78 and 79 and thence pass on to the take-up reels, not shown. The films are shown as moved in contact with one another over the aperture plate by means of a pair of constantly rotating feed sprockets 80 and 81. A continuous film band or loop 82 passes over the aperture plate below films 70 and 71, being engaged and advanced by sprockets 80 and 81 together with films 70 and 71. This film band leaves the curved end 84 of the aperture plate loops under and goes back onto the aperture plate over its curved forward end 85. This endless film band or loop 82 thus moves along apace with the positive and negative films, and the rays from the printing light must pass through it before printing the negative image onto the positive film. Alternate frames of this endless film band are given different densities, so as to vary the intensity of the light printing alternate frames of the negative onto the positive (see Fig. 7), and in this way the present printer achieves the same results as does the differential shutter opening printer previously described. For example, referring again to the illustration of Fig. 1, and considering first the first printing operation from the negative to the positive, alternate frames of endless masking band 82 are provided with such differential densities that A aspect images are printed on the positive to a density of 6 and B aspect images are printed to a density of 3. For the second printing, a different masking band is used, alternate frames of which have such densities that A aspect images are printed to a density of 7 and the alternate B aspect images are printed to a density of 4. As before, the positive and negative films are displaced one frame for this second printing, so that the 7 density A images are superposed over the previously printed 3 density B images, and the 4 density B images are superposed over the previously printed 6 density A images. It will be evident that the masking bands may be printed with a large number of different combinations of densities, as may be desired, an unlimited variety of combinations being possible. It is also obvious that the continuous printer of Fig. 6 may, if desired, be provided with two printing stations, and with an intermediate film take-up means, as in the case of the step printer of Fig. 1, and that in such case both printings may be effected in one continuous operation.

The differential density masking band used in the printer of Fig. 6 is prepared simply by exposing alternate frames of a raw motion film strip one at a time to a plain field, as a white card, which may be illuminated to different intensities as alternate frames of the strip are exposed. After development of the strip, it is placed in the printer and its ends spliced together to form the endless band. A section of such a masking band 82 is illustrated in Fig. 7, alternate frames 70 and 71 being shaded to indicate variational densities. As the negative and positive films are threaded in the printer, care must of course be taken to register the A and B aspect images with the proper frames of the masking band.

It will now be evident that the continuous printer of Fig. 6 is capable of performing the same operations as the step printer of Fig. 2, the differential density masking band of the continuous printer replacing the differential opening shutter device of the printer of Fig. 2.

In the instance of using a high power printing light, and to prevent fogging the positive film around the edges of the frame, a negative masking band is first prepared, having differential masking frames of densities opposite and complementary to the masking band to be used. From this masking band a positive is printed, and in the printing of the positive masking band, an enlarged area overlapping the frame lines on all sides is exposed to the light. The positive masking band is thus made opaque around the frame areas, or in other words, is provided with exterior opaque framing lines.

The present invention also contemplates use of stereoscopic sets of images taken in three aspects. These may have been taken through three horizontally separated photographic apertures, producing what may be referred to as a right, a center, and a left aspect image, or by use of a moving refractor mounted in front of the photographic lens, as disclosed in my aforementioned application, Ser. No. 646,749, or otherwise. A set of three stereoscopically related images may also be formed by exposing successive film frames at a forward position, a rearward position and an intermediate position. Such sets of stereoscopic images may be combined in various manners, as follows:

As an example, it will be assumed that a negative film has been prepared having successive sets of stereoscopic images comprising three aspects taken in positions as follows: right, center, left, center, right, center, etc. The center aspect images is printed on each frame of the positive, with the right and left aspect images being superposed over it alternately. Thus each positive frame will bear a center aspect picture together with either a right or a left aspect image. The densities of the two superposed images are so adjusted that the total density of the composite picture on each positive frame is equivalent to that of a full or normal density positive image. For example, again referring densities to an arbitrary scale in which 10 represents full density, the two superposed images on each positive frame will have density numbers totaling to 10 in each case. For instance, the center aspect image may be printed to a density of 5 on each frame, in which event the right and left aspect images superposed therewith on alternate frames will likewise be printed to densities of 5. Similarly, the density balance between the center aspect image and the right and left aspect images may be in the ratios of 6 to 4, 7 to 3, 8 to 2, or 9 to 1.

It will be obvious that the method of combination described in the preceding paragraph is also applicable to any succession of stereoscopic image sets, each of which comprises three variant physical aspects.

A modified method of combining three aspect sets of stereoscopic images is as follows. Assume again that a negative has been prepared on which the three differing aspects appear in the following order: right, center, left, center, right, etc. If such a negative is run through the printer of Fig. 2, with the positive film strip being caused to lag one frame length at the second printing aperture, in the manner previously described, it will be found that the center aspect image appears on each frame of the positive, while the right image will appear on two successive frames of the positive, followed by two successive frames bearing the left image, and so on, in alternate succession. The differential intensity shutter devices may be adjusted to give any density balance desired. For instance, at the first printing aperture the center frame may be printed onto the positive to a density of 7, and the alternate frames (both left and right aspect images) may be printed to densities of 1. Then at the second printing aperture, whereat the positive film is lagging one frame length relative to its previous position with reference to the negative, the center aspect frames may be printed to a density of 9, and alternate frames (right and left aspect frames) may be printed to densities of 3. The result is a positive print bearing superposed images in the following combinations and densities: first frame, center aspect image of density 7 combined with right aspect image of density 3; second frame, a center aspect image of density 9 combined with a right aspect image of density 1; third frame, a center aspect image of density 7 combined with a left aspect image of density 3; fourth frame, a center aspect image of density 9 combined with a left aspect image of density 1; and so on. Thus each frame again bears a combination of superposed variant aspect images of densities totaling the index number 10, representing full image density.

A variation of the method described in the preceding paragraph is effected by setting the shutter device of the second printing aperture to print one frame and blank the next, thus printing alternate frames only. If the frame printed is the center aspect and the others are blanked, and the shutter openings are properly set, a positive may be obtained of the following type: First frame, center image of density 7, right image of density 3; second frame, center image of density 10; third frame, center image of density 7, left image of density 3; fourth frame, center image of density 10; and so on.

Another method of combining three aspect sets of stereoscopic images is as follows: This type in general comprises combining what may be termed a primary image in major density, a differential picture (one taken in a slightly variant physical aspect) in lesser density, and a third picture in still greater aspect variation and in still lesser density. For example, assuming a negative film bearing three aspect stereoscopic image sets, the component images of which can be represented by numerals 1; 2; 3, number 2 being an aspect variation of number 1, and number 3 being a greater aspect variation of number 1, a typical printing sequence is as follows: first frame, image 1 at density 7 plus image 2 at density 3; second frame, image 1 at density 8 plus image 3 at density 2; third frame, image 1 at density 7 plus image 2 at density 3; fourth frame, image 1 at density 8 plus image 3 at density 2; and so on. Further modifications may be effected following the general rule that the greater the variation of position or aspect from that of the primary picture, the weaker shall be the intensity of the projected variant.

Given a negative bearing sets of stereoscopic images comprising three variant aspects, which aspects may be designed by numerals 1, 2 and 3, and which are arranged in such an order as 1, 2, 1, 3, 1, 2, etc., my printing process may be adapted to produce all three aspects of the scene on each frame of the positive. This may be done by running the negative and positive twice through the double printing aperture printer of Fig. 2, or through a quadruple printing aperture printer, made up of two such printers as shown in Fig. 2 arranged in tandem. At the first printing aperture the positive frames are printed directly from the negative in the usual manner, and therefore bears images in the sequence 1, 2, 1, 3, 1, etc. At the second printing aperture, the positive film is caused to lag one frame length, as by passing it between take-up rollers 24, 25 and 26. At the third printing aperture, the positive film strip is advanced one frame length as compared with its position at the first printing aperture relative to the negative, and at the fourth printing aperture the positive is advanced two frame lengths as compared with its position at the first aperture relative to the negative. It will be evident that each frame of the positive as so printed will bear images 1, 2 and 3 in super-position, with image 1 having been twice printed. If the fourth printing aperture is omitted each positive frame will bear the three superposed images 1, 2 and 3, each of which being printed but once. It will be evident that the densities of the components going to make up each composite image on the final individual positive frames may be printed in unbalanced densities, for instance, by use of the differential density shutter mechanism of the printer of Fig. 2. However, as in the instances previously described, the additive total density of the several components going to make up any given composite image on the final positive is always made equal to full normal density, or in other words, to a density of 10, based on the density scale herein utilized.

If it is desired to further blend and intermingle the differing aspect images beyond that described in any of the processes hereinbefore mentioned, then the positive print resulting from any of the previously described processes is simply again printed in any of the combinations herein described. In this manner the superimposed images are further combined and superimposed, resulting in the production of a final positive in which the several component images are combined and blended to an exceptionally high degree.

It will be evident that it is not at all necessary that the original negative film frame bearing the differing aspect images of the scene be taken originally on a single film strip. They may equally as well be taken on two separate film strips, one bearing images in one aspect and one bearing images in the other, and be superimposed on the positive film strip in the combinations herein disclosed by separate printing operations.

In all of the processes described above, the timing of the projected variations is of importance as well as the relative densities, because it is necessary for each variant image to register on the eye as a separate entity, it being desirable in many cases that the "recessive" image makes its appearance at timed intervals. However, the interval between appearances of any given aspect should not be so great as to cause "flicker" and "jumping". It is therefore necessary to arrive at a point of timing balance as well as density balance for a particular scene. An example of establishing a definite time interval between successive image appearances, is as follows. Assume a negative bearing right eye and left eye aspect images, which may be designated by letters R and L, respectively, and arranged in sequence as R, R, L, L, R, R, etc. It is assumed that the right eye image is to be printed in dominant aspect and the left eye image is to be printed in recessive aspect. The positive film strip is first given a contact printing from the negative, and therefore bears images in the order R, R, L, L, R, R, etc. The positive and negative are then run through a printer for a second printing operation, and for this purpose the continuous printer of Fig. 6 may be employed. In this printing the positive film strip is shifted two frames with reference to its original position relative to the negative, and the endless masking band is arranged to print two frames and blank two frames alternately. For example, two frames of the masking band are made entirely opaque followed by two frames of a density such as will give a positive print of the desired density, followed by two opaque frames, and so on. This masking band is so arranged as to blank the L images of the negative and to print the R images of the negative. The positive film strip being displaced two frame lengths in the second printing operation, the R images are superimposed by this operation over the previously printed L images. The result is a positive print having images as follows: R, R, R plus L, R plus L, R, R, etc. Thus the recessive aspect image L is timed to appear on two frames, then to skip two frames, and so on, while the dominant aspect image appears on every frame.

In like manner, any desired pattern of relative densities and order of repetitive appearances of component members of the stereoscopic combinations can be produced, and each differential density combination may be duplicated or repeated on immediately successive frames while maintaining the progressive action of the pictures.

It has been tacitly assumed in the foregoing that the variant aspect negative frames are normally of the same general density. However, it is to be noted that they are not necessarily so, and the positive prints may be made from variant aspect negative frames of different densities by giving proportionately more printing time, or a higher intensity printing light, to the frames bearing the images of greater density.

It is to be understood that the processing herein described is required to be performed but once for each picture released. When the first positive print is completed, a duplicate negative is made from it, and distribution prints are made from the duplicate negative in the ordinary manner.

When my stereoscopic system is used in conjunction with a color separation process, using color separation negatives, for example, having plural negatives representing differing color aspects of a scene, then a separate positive is made from each individual negative onto an individual positive, in the manner of combining the differential physical aspect picture in their differential densities as described hereinabove for the purpose of a black and white picture. This yields three color separation positives, which are individually correct and complete in their stereoscopic combinations. A duplicate negative is then made from each of the stereoscopic positives, and that duplicate negative used thereafter as the original color separation negative would ordinarily be used if the stereoscopic combination had not been introduced.

By using the herein described printing methods and means, the differing color aspects of a scene, as commonly photographed on color separation negatives, may be fluctuated among themselves in relation to each other on successive frames, or in series of frames, to produce better light mixing, or other novel effects, independently of any stereoscopic photography. For example, the original red aspect negative can be printed onto a second red aspect negative, with odd numbered frames made of stronger density than the even numbered frames; the original yellow aspect negative can be printed onto a second yellow aspect negative, with the even numbered frames made of stronger density than the odd numbered frames; and the original blue aspect negative can be used without change, or any other desired variations effected. The color balance is thereby maintained, but the relative intensities of some of the color aspects are fluctuated with relation to each other in a novel manner, yielding an increased blend of color values.

I claim:

1. The method of printing a positive film strip from a negative film strip bearing on successive frames the variant component images of stereoscopic image sets, that comprises printing the images on the negative to partial density on the positive film strip, and varying the quantity of printing light such that the densities of successive images so printed on the positive alternate between two values, then again printing the positive film strip from the negative, but with the positive shifted an integral number of frame lengths with reference to the negative, whereby slightly differing images become superposed on the positive, and in such second printing, so varying the quantity of printing light that the images on the negative are printed to partial densities on the positive, whereby the positive frames receive superposed component images in partial densities, making up successive composite images of substantially normal densities.

2. The method of printing a positive film strip from a negative film strip bearing on successive frames the variant component images of stereoscopic image sets, that comprises printing the images on the negative to partial density on the positive film strip, and in such printing, varying the quantity of printing light such that the densities of successive images so printed on the positive alternate between two values, then again printing the positive film strip from the negative, but with the positive shifted an integral number of frame lengths with referene to the negative, whereby slightly differing images become superposed on the positive, and in such second printing, varying the quantity of printing light such that the images on the negative are printed two sufficient densities on the positive to produce composite images on the positive frames of substantially normal densities.

3. The method of printing a positive film strip from a negative film strip bearing on successive frames the individual members of stereoscopic image pairs, that comprises first printing alternate frames of the positive to two different partial density values from the negative, then again printing the positive film strip from the negative, with the positive film strip shifted one frame length with reference to the negative, and to densities reciprocal and complementary to those effected in the first printing and such that composite images so printed on the positive frames are of substantially normal densities.

4. The method of printing a positive film strip from a negative film strip bearing on successive frames variant aspect component images of stereoscopic image pairs, such variant aspect component images ocupying relatively different lateral positions on their respective film frames, that comprises running the films past two printing apertures, printing every other negative film frame to partial density onto the positive at the first aperture, printing the other negative frames to partial density at the second aperture, with the positive film strip laterally offset from the negative strip at the second aperture by an amount equal to the lateral distance between two corresponding points of the component images of a given stereoscopic image pair, then running the negative and positive films past two printing apertures, with the positive strip displaced longitudinally one frame length with reference to its former position, and printing to partial density onto the positive at the first aperture those negative frames which were previously printed at the first aperture, and at the second aperture those negative frames which were previously printed at the second aperture, with the positive strip laterally offset at the second aperture by an amount equal to its offset in the former printing at the second aperture.

5. In the art in cinematography of effecting reciprocal variations in fractional densities, split between sustained, stereoscopically related aspects of a motion picture scene, the method comprising placing negative film frames containing successive images in one stereoscopic aspect in printing relation to the successive frames of a positive film strip, passing a given fractional quantity of light, sufficient to print a positive to partial density, through said negative film frames while in printing relation to certain regularly separated frames of the positive strip recurring in predetermined numerical order, passing a lesser quantity of light through the negative film frames while in printing relation to positive film frames between said first mentioned positive frames, placing negative film frames having successive images in a different stereoscopic aspect in printing relation to the successive frames of said positive film strip, and passing through said negative film frames while in printing relation to the positive film frames in fractional quantities which are reciprocal to the quantities of light employed in printing the images in the first mentioned aspect.

6. A method as claimed in claim 5, in which the quantity of light passed through negative frames in printing one stereoscopic aspect is always greater than the quantity of light passed through negative frames in printing in different stereoscopic aspect, whereby said one stereoscopic aspect will predominate in density on all frames of the printed positive.

7. A method as claimed in claim 5, in which a sufficient quantity of light is passed through alternate negative frames having one stereoscopic aspect to print said frames to greater than half normal density on alternate positive frames and a lesser quantity of light is passed through the remaining negative frames having said one stereoscopic aspect to print said remaining negative frames to less than half normal density on the remaining positive frames, and in which quantities of light are passed through negative frames in the other stereoscopic aspect reciprocal to the quantities of light employed in printing the frames having the first stereoscopic aspect, whereby the two stereoscopic aspects will be printed on all frames of the positive with alternate density emphasis on succeeding positive frames.

8. The art in cinematography which comprises producing a diverse plurality of fractional density combinations between differing sustained aspects of a scene, and from negative frames producing individual frames along a positive motion picture strip, and subjecting a portion at least of the positive frames each to impressions of a plurality of image elements, the several elements being identified individually with complementary dissimilar aspects of the scene, each such separation aspect being critically analytical of a sustained phase of nature objectively fixed in the scene, and printing the aspects onto the positive frames superposed, and by frames intermingled along the strip successively in a plurality of distinct series in interspersed order of frames in distinctly different fractional density combinations, and printing the member frames of one such series uniformly to compound impressions of predetermined ratio in their component image element intensities, and printing the member frames of another series uniformly to compound impressions of different predetermined ratio in their component image element intensities, and printing contiguous frames to a substantially uniform total picture intensity, whereby the intensity of a sustained limited aspect is fluctuated to predetermined fractional degree within itself among the frames successively along the strip, to cause on projection a recurrent fluctuation of intensity in respect to said limited aspect on a local image of a natural fixed object, while the over-all picture intensity is maintained uniform, on projection of the frames uniformly and consecutively from the strip.

9. The art in cinematography of producing a plurality of diverse fractional density combinations between differing color aspects of a scene which comprises preparing by known methods negative frames in complementary dissimilar color aspects of a scene, and from such negative frames printing individual frames of a positive motion picture strip, and subjecting a portion at least of the positive frames each to impressions of a plurality of image elements identified individually with dissimilar color aspects of the scene, and printing a plurality of the image elements onto the positive strip superposed, and in frames in a plurality of distinct frame series interspersed along the strip consecutively in a numerical order in respect to their diverse fractional density combinations, and printing the member frames of one such series uniformly to compound impressions of predetermined ratio in their component image element intensities, and printing the interspersed member frames of another series to compound impressions of intensities in ratio different from the last said predetermined ratio, and printing contiguous frames to a substantially uniform total picture intensity, whereby the intensity of a sustained limited color aspect is fluctuated to predetermined fractional degree within itself among the frames consecutively along the strip, to cause on projection a recurrent fluctuation of intensity in respect to said limited aspect on a local image of a natural fixed object, while the over-all picture intensity is maintained uniform, on projection of the frames uniformly and consecutively from the strip.

10. The art in cinematography of producing film strip frames in combination suitable for uniform projection of a consecutive plurality of diverse fractional density combinations between differing aspects of a scene, which comprises controlling the light values in color separation picture elements of a scene while producing images of a selected color aspect in a plurality of differing intensity gradients interspersed in a straight line consecutively on and along a motion picture strip, and controlling the light values in other selected complementary color aspect picture elements of the scene while producing a second selected color aspect in a plurality of differing intensity gradients interspersed in a straight line consecutively on and along a motion picture strip, and superposing the said selected color aspects on common positive frame surfaces while subjecting the contiguous positive frames to total picture densities substantially uniform each with the others by supplementing the diverse intensity gradients in the first selected color aspect each individually with complementary gradient intensity of other selected color aspect, whereby the frames are capable of uniform consecutive projection fluctuating the relative intensities of some of the color aspects relative to each other while maintaining uniform the total picture intensity.

11. The art in cinematography which comprises from negative frames reproducing an aspect of a scene onto a positive motion picture strip, and producing said aspect consistently onto each and all of the frames comprising the effective scene, and causing said aspect to form a primary element thereof, and from negative frames reproducing a different complementary aspect of the scene onto the positive strip, and reproducing said aspect onto a limited number of the frames, and causing said aspect to form a secondary superposed element added to the primary element thereof, by reproducing said secondary aspect in a minority intensity onto the limited number of frames, whereby a portion of the number of frames are printed to the primary aspect alone, and another portion of the number of frames are printed to plural aspects in a differential intensity ratio whereby the primary aspect is predominant, and interspersing the single aspect frames with the plural aspect frames in distinct series.

12. The method of producing fractional density variations in a printing apparatus in cinematography which comprises positioning a negative strip in printing relationship to a positive strip, and postioning an additional non-picture strip bearing frame areas in distinct series in contact with said negative at the printing aperture, and interspersing the non-picture member frames of one light transmission value series with the non-picture member frames of another light transmission value series, and advancing the frames, non-picture, negative, and positive, in registration and synchronization past the printing aperture over a substantial period of time, while printing differential intensities within a sustained scene in which variations are produced between differing complementary aspects of a scene, and in which a negative strip is again positioned in printing relationship to the same positive in similar manner and the strips again advanced in frame registration and uniform synchronization past the printing aperture, thereby printing successive positive frames to diverse complementary aspects of a common scene in composite density uniform among the frames, and fluctuating intensity between fractional values along the frames within a selected aspect of the scene.

13. A method as claimed in claim 9, in which a selected color aspect is printed to consistently greater intensity than another color aspect.

14. The art in cinematography which comprises producing a plurality of fractional density combinations within and among multiple differing sustained elemental aspects of a scene, and from negative frames producing individual frames along a positive motion picture strip, and subjecting the positive frames so produced to impressions of a multiplicity of sustained complementary elemental aspect images, each elemental aspect having a local image of the scene internally sustained within and throughout such aspect along the strip in a constant phase of such local image, the multiplicity of elemental image aspects being identified individually with complementary dissimilar natural aspects of the scene, and printing frames of the positive strip to a plurality of the aspects superposed thereon in differing intensities, and causing a limited portion of the frames to be a distinct frame series by compounding the frames of said limited portion of frames uniformly to impressions of constant ratio as to their component elemental aspect intensities, and causing another limited portion of the frames to be another distinct frame series by compounding the frames of said limited portion of the frames uniformly to impressions of different ratio in their component elemental aspect intensities, and recurrently interspersing the member frames of one frame series with the member frames of different frame series throughout the succession of frames along the strip, and producing the positive strip to substantially uniform final frame density, whereby on consecutive uniform projection of the frames there are projected intensity variations internally within the picture among the multiple aspects, and the scene is projected in consistently uniform over-all intensity.

15. The art in cinematography which comprises producing a multiplicity of fractional density combinations between differing sustained elemental aspects of a scene, and from negative frames producing individual frames along a positive motion picture strip, and subjecting positive frames so produced to multiple impressions of each of a plurality of sustained complementary elemental aspect images, each elemental aspect being critically analytical of a local image of the scene internally sustained in and throughout the appearances of such aspect along the strip as a uniform phase of such local image, and the plurality of elemental aspect images being identified individually with complementary dissimilar natural aspects of the scene, and printing frames of the positive strip to a multiplicity of diverse intensities among the superposed elemental aspects, and causing a limited number of the frames to be a distinct frame series by compounding said frames to diverse aspects in a selected intensity ratio thereof, and causing another limited number of the frames to be another distinct frame series by compounding said frames to diverse aspects in a selected dissimilar intensity ratio thereof, and recurrently interspersing the member frames of one frame series with the member frames of different frame series throughout the succession of frames along the strip, and producing the positive strip to substantially uniform final frame density, whereby on consecutive uniform projection of the frames there are projected multiple intensity variations internally within the picture among the plural aspects, and the scene is projected in consistenly uniform over-all intensity.

16. The art in cinematography of producing relief effect combinations of diverse viewpoint aspects of a scene which comprises from negative frames printing the positive frames of a motion picture strip to a plurality of series of pictures each series identified individually with a laterally distinct fixed viewpoint position of the scene, and imprinting upon positive film frame areas at a distance fixed laterally from the film edge line the image of an object fixed within the natural scene at a specific distance in the depth of space, and simultaneously imprinting thereon at a distance fixed laterally from the film edge line the image of another object fixed within the natural scene at a different distance in the depth of space, and again imprinting upon the same positive film frame areas a complementary picture pertaining to a laterally spaced viewpoint and in said second printing imprinting upon the film frame areas the image of the first said object in registration with the position of its first printed counterpart by selectively controlling the edge line of one of the films to be slightly shifted relative to the edge line of the other film, and simultaneously in said second printing imprinting upon the film frame areas the image of the second said object in slightly displaced position relative to the position of its first printed counterpart, whereby all local images of the scene pertaining to fixed objects at a selected depth plane distance are printed consistently to a registration throughout the scene, while all local images of the scene pertaining to fixed objects at a differing depth plane distance are printed consistently to a composite character of misregistration split between differing positions in the frames.

17. A method as claimed in claim 16, in which a series of the positive frames are at the second printing consistently imprinted to a lesser intensity than at the first printing.

IVAN M. TERWILLIGER.